United States Patent
Vanlier

(10) Patent No.: US 7,300,159 B2
(45) Date of Patent: Nov. 27, 2007

(54) SCROLLING COLOR PROJECTION SYSTEM WITH LAMP SYNCHRONIZATION

(75) Inventor: Gerardus Johannes Josephus Vanlier, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 301 days.

(21) Appl. No.: 10/528,625

(22) PCT Filed: Aug. 8, 2003

(86) PCT No.: PCT/IB03/03564

§ 371 (c)(1),
(2), (4) Date: Mar. 22, 2005

(87) PCT Pub. No.: WO2004/030371

PCT Pub. Date: Apr. 8, 2004

(65) Prior Publication Data

US 2006/0033885 A1    Feb. 16, 2006

(30) Foreign Application Priority Data

Sep. 25, 2002    (EP) .................................. 02078973

(51) Int. Cl.
G03B 21/14    (2006.01)
H04N 9/12    (2006.01)

(52) U.S. Cl. .......................... 353/84; 353/31; 348/743

(58) Field of Classification Search .................. 353/85, 353/31, 33, 34, 37; 349/5, 6, 7, 8, 9; 348/742, 348/743, 771
See application file for complete search history.

(56) References Cited

U.S. PATENT DOCUMENTS

| | | | | |
|---|---|---|---|---|
| 5,046,162 A * | 9/1991 | Ishikawa et al. | ............ | 348/270 |
| 5,706,061 A * | 1/1998 | Marshall et al. | ............ | 348/743 |
| 6,246,185 B1 * | 6/2001 | Parks | .......................... | 315/291 |
| 6,511,183 B2 * | 1/2003 | Shimizu et al. | ............... | 353/20 |
| 6,563,551 B1 * | 5/2003 | Janssen et al. | ............... | 348/759 |
| 6,631,996 B2 * | 10/2003 | Moench et al. | ................ | 353/85 |
| 7,156,525 B2 * | 1/2007 | Schwartz et al. | ............. | 353/85 |
| 2001/0022692 A1 | 9/2001 | Vanlier et al. | | |
| 2004/0141158 A1 * | 7/2004 | Childers et al. | ............... | 353/85 |
| 2005/0088622 A1 * | 4/2005 | De Vaan et al. | .............. | 353/31 |
| 2005/0094110 A1 * | 5/2005 | Nakamura | .................... | 353/85 |
| 2005/0185149 A1 * | 8/2005 | Lurkens et al. | ............... | 353/85 |
| 2005/0213045 A1 * | 9/2005 | Taoka et al. | ................... | 353/31 |
| 2006/0139578 A1 * | 6/2006 | Nakagawa et al. | ........... | 353/85 |
| 2006/0268241 A1 * | 11/2006 | Watson et al. | ................ | 353/94 |

* cited by examiner

Primary Examiner—William C. Dowling

(57) ABSTRACT

A scrolling color projection system, comprising a pulsed lamp (4) and a color scanner (6, 8a, 8b, 8c, 9) for generating a light beam (5b) with a plurality of scrolling color fields, arranged to illuminate a display device (1, 3) to produce a projection of an image generated by the display device, wherein the frequency of the lamp is controlled so as to be related to the frame rate of the display device. By controlling the lamp frequency in relation to the frame rate, a generated interference pattern can be controlled to be distributed over several frame periods and over the entire height of the display. In particular, the pattern can be controlled in such a way that it is not perceptible to the human eye.

11 Claims, 4 Drawing Sheets

SCROLLING COLOR PROJECTION SYSTEM WITH LAMP SYNCHRONIZATION

The present invention relates to a scrolling color projection system comprising a pulsed lamp and a color scanner for generating a light beam with a plurality of scrolling color fields, arranged to illuminate a display device to produce a projection of an image generated by the display device. The invention also relates to a method of driving such a system.

Such projection systems are particular in that light from a light source is divided into a plurality of beams, which are sequentially scrolled over a display device, e.g. a reflective LCD, and then projected by means of a lens. Normally, the three beams (R, G, B) are arranged to form three horizontal bars with a total height which is large enough to cover the reflective display. The bars are scrolled, e.g. from top to bottom, and are synchronized with the display so that they complete a scrolling sequence within one picture frame.

In such projector systems, it is advantageous to use a light source, e.g. a UHP (ultra high performance) lamp from Philips, having a superposed current pulse to stabilize the arc position. In a scrolling color type of projection system, such a current pulse may interfere with the color scanner and result in visible interference patterns in the projected image. In principle, the pulse acts as a stroboscope, highlighting a momentary image of the scanner, and may make interference patterns in the form of color bars or the intermediate fields (spokes) visible on the screen. If the pulse frequency is a sub-frequency of the frame rate, the interference pattern will be fixed, and if the lamp frequency is out of phase with the frame rate, the bars will roll across the screen.

An object of the present invention is to mitigate the above problem, and reduce image interference in a scrolling projector system.

These and other objects are achieved with a projector and a method of the type mentioned in the opening paragraph, wherein the lamp frequency is controlled so as to be related to the frame rate of the display device.

According to the invention, the above-mentioned interference patterns are reduced or eliminated by controlling the lamp frequency depending on the frame rate. Extra optical components, which cause light loss, are not necessary.

By controlling the lamp frequency in relation to the frame rate, a generated interference pattern can be controlled to be distributed over several frame periods and over the entire height of the display. In particular, the pattern can be controlled in such a way that it is not perceptible to the human eye.

According to a preferred embodiment, the lamp frequency is controlled so that the resulting lamp pulse frequency is an average of two consecutive scanner sub-harmonic frequencies causing visible interference patterns in the image. The lamp pulse frequency is the frequency of the lamp stabilization pulses of the light flux, typically, but not necessarily, twice the lamp frequency. A scanner sub-harmonic frequency is a frequency which is a sub-harmonic of either the frame rate itself, or the rate of intermediate fields between color bars (spokes), which is three times the frame rate in a three color system, e.g. R, G, B.

By such a selection of the lamp frequency, the resulting interface pattern is average over time and space, making it imperceptible to the human eye.

The lamp frequency can be controlled by obtaining a frame synchronization pulse signal from the display driver, multiplying this synchronization signal by a factor to obtain a lamp frequency control signal, and controlling the lamp frequency in accordance with this control signal. This provides a simple implementation of the invention, requiring only a frequency multiplier and a lamp driver of which the lamp frequency can be controlled.

The multiplier factor is preferably defined as $$k=(3/4)*(1/n+1/m),$$

where n is the number of a first scanner sub-harmonic frequency, and m is the number of a second scanner sub-harmonic frequency (n and m are not necessarily integers).

Such a factor results in a lamp pulse frequency which is an average of two scanner sub-harmonic frequencies, as defined above. Note that the relationship is based upon the fact that the frequency of the pulse is twice that of the lamp, and that there are three separate fields in the scanning beam.

The numbers n and m can preferably be chosen as numbers of consecutive sub-harmonics causing visible interference patterns in the image.

These and other aspects of the invention will be apparent from the preferred embodiments more clearly described with reference to the appended drawings.

Figure 1:
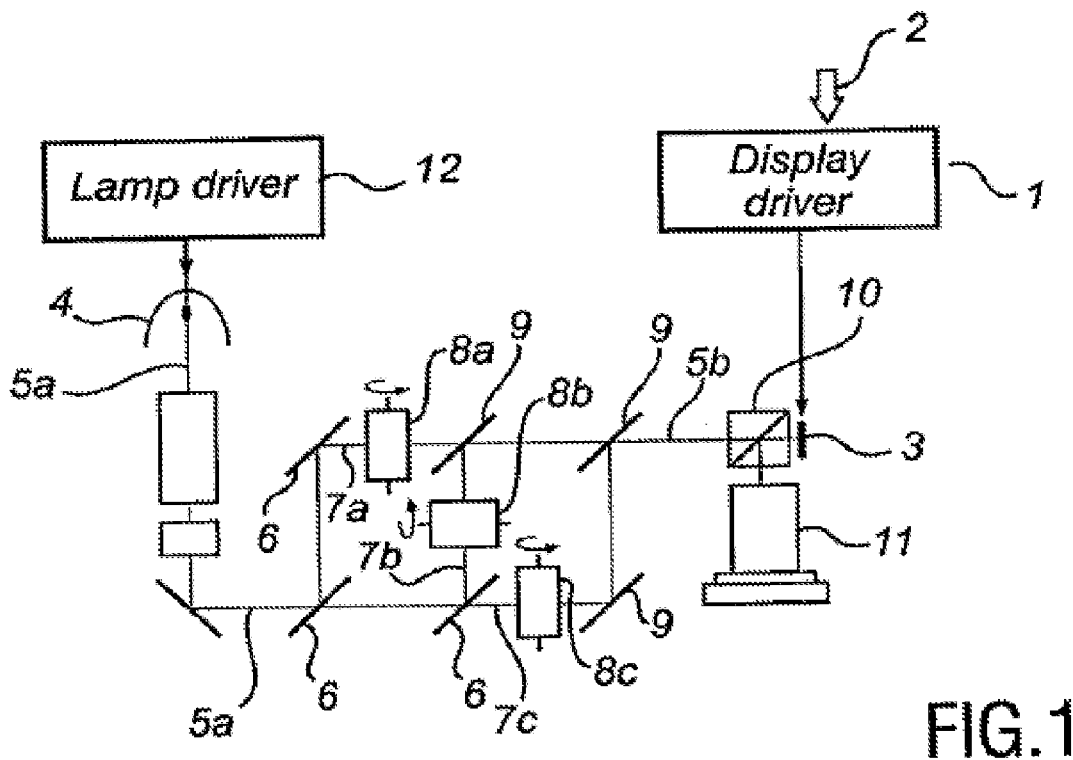
FIG. 1 is a schematic view of a scrolling color projection system according to the prior art.

A projection system with scrolling color scanning according to the prior art, also referred to as a Scrolling Color Sequential (SCS) system, is illustrated in FIG. 1. The system comprises a display driver 1, arranged to receive a data or video input stream 2, from e.g. a personal computer or a video cassette recorder (not shown), and to drive a display device 3, such as a reflective LCD. A light source 4, preferably a UHP lamp followed by an integrator, is controlled by a lamp driver 12 to generate a light beam 5a, which passes through a color scanner (6, 8a, 8b, 8c, 9). The color scanner converts the light beam 5a from the lamp 4 into a beam 5b having a plurality of differently colored fields, typically three color bars (R, G, B), continuously scrolling from top to bottom (see FIG. 2).

In the example illustrated in FIG. 1, a first set of mirrors 6 divides the beam 5a into three beams 7a, 7b, 7c. These beams are guided through three scanning prisms 8a, 8b, 8c (red, green and blue), and a second set of mirrors 9 recombines the beams into one beam 5b, as described above. The mirrors 6, 9 and the prisms 8a, 8b, 8c together form the color scanner.

The beam 5b with scrolling color bars 23 is directed onto the display device 3, and an image generated by the display device 3 is reflected back into a polarizing beam splitter (PBS) 10. The PBS 10 directs the reflected image to a projection lens 11, for projection on a suitable screen (not shown).

Figure 2:
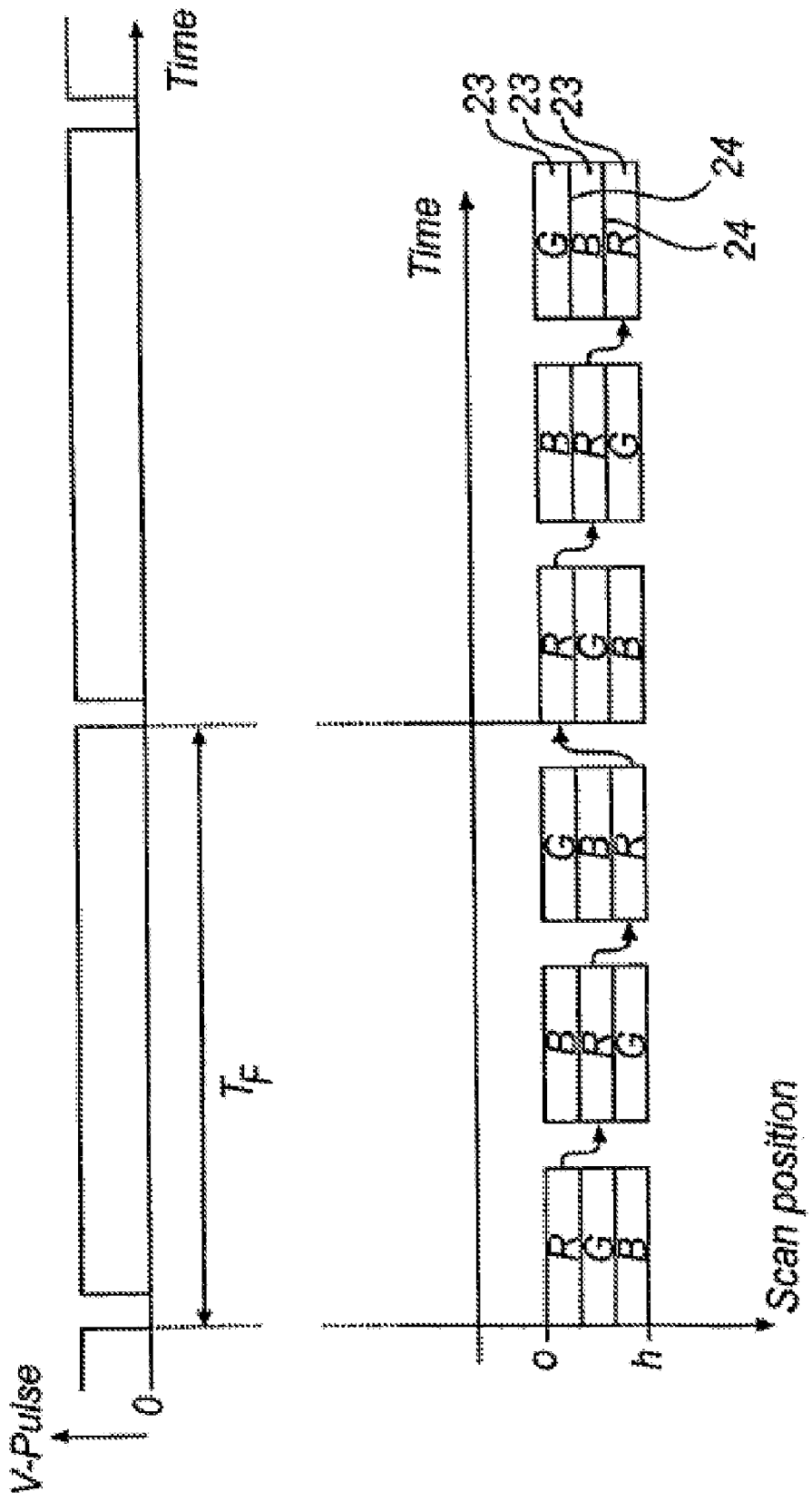
FIG. 2 shows a scanner output of the projection system in FIG. 1.

The scanning performed by the color scanner 8a, 8b, 8c is synchronized with the frame rate of the video data 2, so that the color bars 23 of the beam 5b complete a scrolling sequence (return to original position) in one frame period $T_F$. This is illustrated in FIG. 2.

Figure 3:
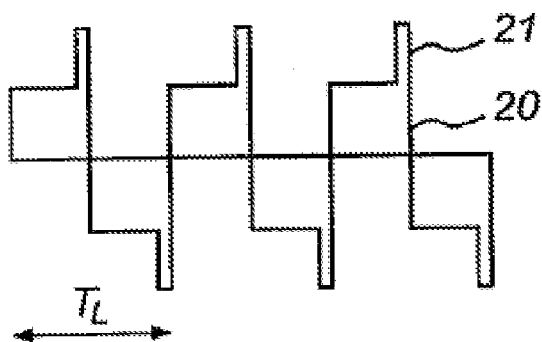
FIG. 3 is a diagram of a current waveform for a UHP lamp with pulsed arc stabilisation.
Figure 4:
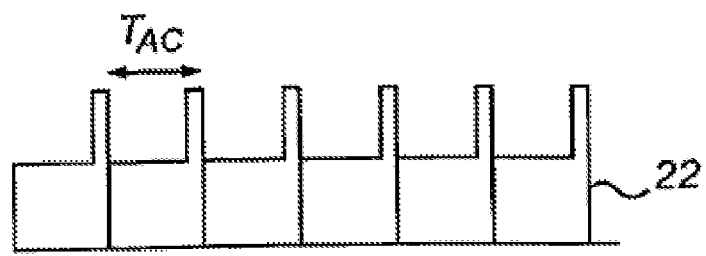
FIG. 4 is a diagram of a lamp flux output corresponding to the current in FIG. 3.

The diagram in FIG. 3 shows a typical current waveform 20 with period $T_L$ in the UHP lamp 4, including a pulse 21 to stabilize the arc position. The diagram in FIG. 4 shows the corresponding lamp flux 22 from the projection lamp 4, which is essentially the rectified waveform 20 in FIG. 3. As is clear from FIG. 4, the lamp flux 22 comprises a DC flux with a superimposed AC light flux, resulting from the stabilizing pulse 21. As a consequence from the rectification, the period $T_{AC}$ of the AC component is only half of $T_L$, i.e. the pulse frequency is twice the lamp frequency.

As mentioned above, the AC light flux resulting from the stabilization pulse acts as a fictitious light source, and causes a stroboscopic effect on the color scanner 8a, 8b, 8c. When the frequency of this AC component of the light flux (referred to as the pulse frequency) is a sub-harmonic of the display frame rate frequency, the color bars 23 can be 'captured' by the stroboscopic effect, resulting in visible color bars in the projected image. When lamp frequency and frame rate frequency are locked, the visible bars are fixed in one position. If they are not locked (i.e. asynchronic), the visible bars will be scrolling over the screen because lamp and scanner are asynchronic. The phase between lamp frequency and frame rate frequency determines the position of the color bars on the screen.

Because there is, in practice, an overlap or a distance 24 between adjacent color bars of the scanner, additional interference patterns may be visible. These 'spokes' 24 of the scanner will be visible when the pulse frequency is a sub-harmonic of these 'spokes'. As the spoke frequency is three times the frame rate (in the illustrated case with three colors), this will occur even more often.

The following table includes a number of sub-harmonics that can be distinguished in case the color bars are equal in width. Of course, in principle, there is an infinite number of sub-harmonics, but the table only includes those that result in the most visible interference patterns. Display frame rate frequency is assumed to be 180 Hz (i.e. spoke frequency is 540 Hz), and scanning is performed with linear scan velocity:

TABLE 1

Scanner sub-harmonics.

| Lamp frequency | Lamp pulse frequency | Sub-harmonic of frame rate freq. | Sub-harmonic of spoke frequency |
| --- | --- | --- | --- |
| 270.0 | 540.0 |   | 1 |
| 180.0 | 360.0 |   | 1.5 |
| 135.0 | 270.0 |   | 2 |
| 90.0  | 180.0 | 1 | 3 |
| 67.5  | 135.0 |   | 4 |
| 60.0  | 120.0 |   | 4.5 |
| 54.0  | 108.0 |   | 5 |
| 45.0  | 90.0  | 2 | 6 |
| 38.6  | 77.1  |   | 7 |
| 36.0  | 72.0  |   | 7.5 |
| 33.8  | 67.5  |   | 8 |
| 30.0  | 60.0  | 3 | 9 |
| 27.0  | 54.0  |   | 10 |
| 25.7  | 51.4  |   | 10.5 |
| 24.5  | 49.1  |   | 11 |
| 22.5  | 45.0  | 4 | 12 |
| 20.8  | 41.5  |   | 13 |
| 20.0  | 40.0  |   | 13.5 |
| 19.3  | 38.6  |   | 14 |
| 18.0  | 36.0  | 5 | 15 |

For the lamp frequencies causing a pulse frequency which is a sub-harmonic of the frame rate, fixed color bars will be visible on the screen. For spoke frequency sub-harmonics, spokes will be visible on the screen. All these frequencies are here referred to as scanner sub-harmonic frequencies.

As mentioned above, Table 1 includes the lamp frequencies resulting in the most visible interference patterns. With different frame rate, number of spokes, distance between spokes, etc, these lamp frequencies can be different. Such a selection of lamp frequencies, resulting in noticeable interference patterns, can be utilized when optimizing a synchronization according to the invention. This will be described below, with reference to Table 1 as an example of such a selection.

Figure 5:
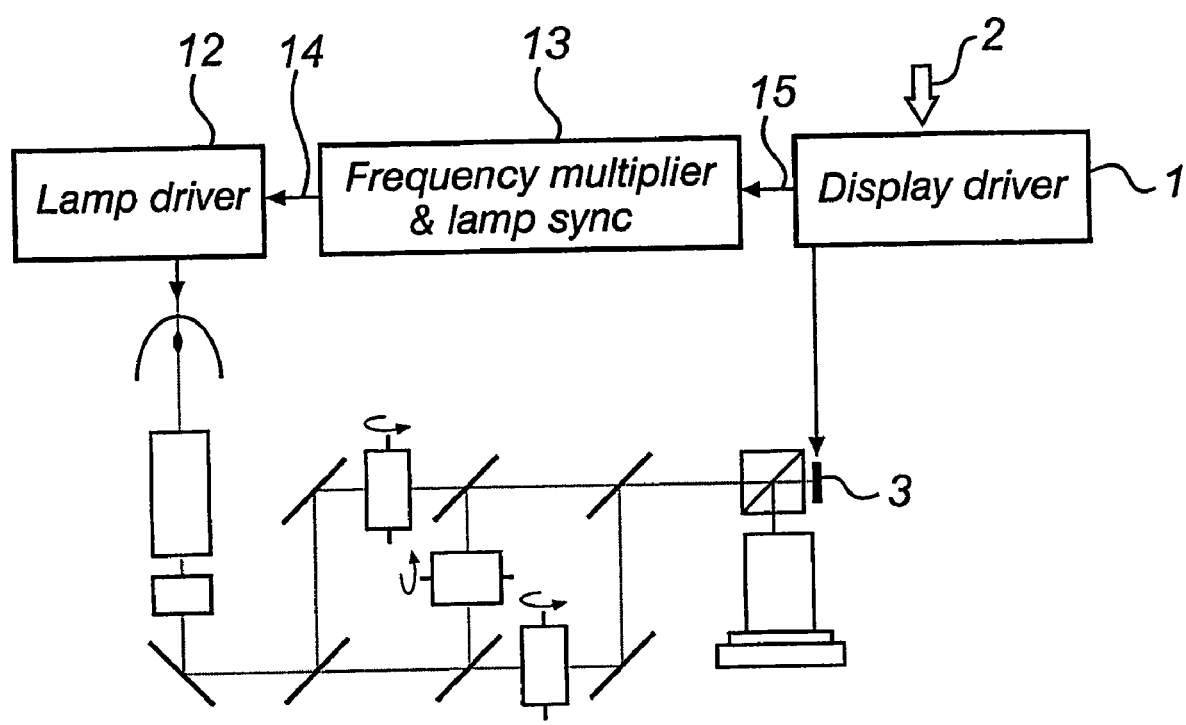
FIG. 5 is a schematic view of a scrolling color projection system according to an embodiment of the invention.

According to the present invention, such interference patterns can be reduced or alleviated by correlating the lamp frequency with the frame rate. This can be accomplished by introducing a synchronizer 13 between the lamp driver 12 and the display driver 1, as is illustrated in FIG. 5. The synchronizer 13 is adapted to receive a synchronization pulse signal from the display driver 1, and generate a lamp frequency control signal 14 by multiplying this signal 15 by a factor k. The lamp driver 12 is adapted to receive this control signal 14, and to control the lamp frequency $f_{lamp}$ in accordance with this control signal 14. As a consequence, the lamp frequency is controlled depending on the frame rate, and also synchronized with the frame rate.

In the following description, the lamp frequency $f_{lamp}$ is controlled to be a fixed ratio of the frame rate $f_{frame}$, but this is not a limitation of the present invention, as more complex, dynamic or adaptive, relationships are envisageable.

The factor k can preferably be an average of two consecutive sub-harmonic frequencies, from the first column in Table 1. For a linear scan velocity, this can be expressed as:

$$f_{lamp}=(1/2)*(f_n+f_m), \qquad (1)$$

where $f_n$ equals a first scanner sub-harmonic lamp frequency and $f_m$ the next consecutive scanner sub-harmonic lamp frequency according to a selection such as Table 1. It is clear from the above that in the present example, a particular lamp frequency $f_{lamp}$ causes a sub-harmonic interference pattern if $$f_{pulse}=2*f_{lamp}=(1/n)*f_{spoke}=(1/n)*3f_{frame},$$

where $f_{pulse}$ is the frequency of the stabilization pulse of the lamp, $f_{spoke}$ is the frequency of the spokes between the scrolling color bars, and n is the number of the sub-harmonic (note that n is not necessarily an integer, as is clear from Table 1).

This leads to the following expression for $f_n$:

$$f_n=(3/2)*(1/n)*f_{frame}. \qquad (2)$$

By substituting equation 2 into equation 1, a relationship now can be defined between the desired lamp frequency and the frame rate frequency:

$$f_{lamp}=f_{frame}*(3/4)*(1/n+1/m), \qquad (3)$$

where n is the number of a first scanner sub-harmonic lamp frequency, and m is the number of the next consecutive scanner sub-harmonic lamp frequency in a selection such as Table 1. Note again that n and m are not necessarily integers.

The ratio $f_{lamp}/f_{frame}$ can be implemented as the multiplier factor (k) of the synchronizer 12.

Note that Eq.3 is true only if the pulse frequency $f_{pulse}$ is double the lamp frequency $f_{lamp}$, and the spoke frequency $f_{spoke}$ is three times the frame rate $f_{frame}$. For other cases, Eq.2 will have to read differently, and Eq.3 will be altered accordingly. If, for example, the pulse frequency is equal to the lamp frequency, the factor k should be multiplied by a factor of two.

Figure 6:
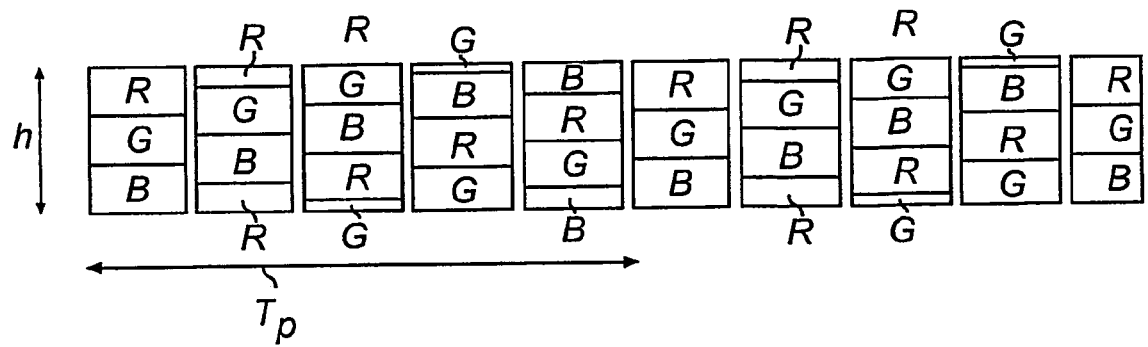
FIG. 6 shows scanner positions corresponding to pulses in light flux.

To illustrate the effect of such a lamp control, FIG. 6 shows the scanner position whenever a pulse in the light flux occurs. In the illustrated example, the lamp frequency is an average of the 2nd and 3rd sub-frequencies, i.e. a multiplier factor, k, equal to 5/8. Again, equal color bars are assumed. The Figure discloses a periodicity of five scanner positions, marked in the Figure as $T_p$. The duration of $T_p$ is five pulses, that is five periods of the light flux 22, or 5/2 periods of the lamp current 20. This in turn equals (5/2)/(5/8)=4 frames.

Figure 7:
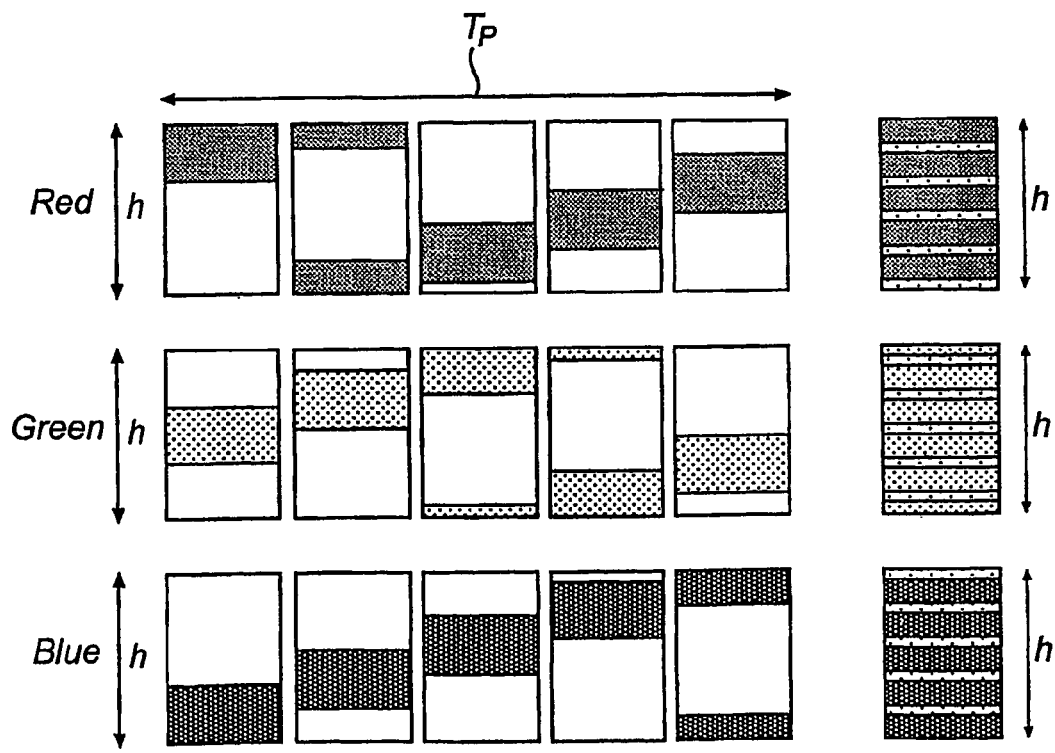
FIG. 7 shows the three colors in FIG. 6, each represented separately.

In FIG. 7, the five scanner positions during the period $T_p$ are illustrated for each color separately. It can be seen that, within the five scanner positions, the individual colors R, G and B can fill the complete scan width h. Through this distribution, the error in light amplitude (caused by the light pulse) is spread across the total height h and the 4 frame time periods.

In order to achieve satisfactory results, the total period of the scanner positions should be sufficiently long, and the distribution over the height h should be sufficiently even, in order to avoid perceived flickering by the human eye. This can be adjusted with the multiplier factor, given frame rate frequency and allowable lamp frequency.

It is clear that the detailed description above is related to a specific embodiment of the invention, influenced by the details of the illustrated scrolling projection system. As has been pointed out above, changes in the system design parameters, such as relationships between frequencies, may require adjustments of the above expressions. Such modifications performed by the skilled person are considered to be covered by the inventive concept defined by the appended claims.

The invention claimed is:

1. A scrolling color projection system, comprising a pulsed lamp and a color scanner for generating a light beam with a plurality of scrolling color fields, arranged to illuminate a display device to produce a projection of an image generated by the display device, wherein the frequency of the lamp is controlled so as to be less than and related to the frame rate of the display device.

2. A projection system as claimed in claim 1, wherein said lamp frequency is controlled so that the resulting lamp pulse frequency is an average of two consecutive scanner sub-harmonic frequencies causing visible interference patterns in the image.

3. A projection system as claimed in claim 1, further comprising a frequency multiplier, connected to a synchronization pulse signal of said display panel, and arranged to multiply said synchronization pulse signal with a factor so as to generate a lamp frequency control signal.

4. A projection system as claimed in claim 3, further comprising a lamp driver, connected to said lamp frequency control signal, and arranged to control the lamp frequency in accordance with said control signal.

5. A method of operating a scrolling color projection system, the system comprising a pulsed lamp and a color scanner for generating a light beam with scrolling color fields, arranged to illuminate a display device to produce a projection of an image generated by the display device, the method including controlling the frequency of the lamp so as to be less than and related to the frame rate Of the display device.

6. A projection system as claimed in claim 5, wherein said lamp frequency is controlled so that the resulting lamp pulse frequency is an average of two consecutive scanner sub-harmonic frequencies causing visible interference patterns in the image.

7. A method as claimed in claim 5, wherein the step of controlling the lamp frequency includes:
   obtaining a frame synchronization pulse signal,
   multiplying said synchronization signal by a factor) to obtain a lamp frequency control signal, and
   controlling the lamp frequency in accordance with said control signal.

8. A method as claimed in claim 7, wherein said factor is defined as:

$$k=(3/4)*(1/n+1/m),$$

where n is the number of a first scanner sub-harmonic frequency, and m is the number of a second scanner sub-harmonic frequency, n and m not necessarily being integers.

9. The method of claim 8, wherein n and m represent consecutive sub-harmonic frequencies.

10. A projection system as claimed in claim 2, further comprising a frequency multiplier, connected to a synchronization pulse signal of said display panel, and arranged to multiply said synchronization pulse signal with a factor (k) so as to generate a lamp frequency control signal.

11. A method as claimed in claim 6, wherein the step of controlling the lamp frequency includes:
   obtaining a frame synchronization pulse signal,
   multiplying said synchronization signal by a factor (k), to obtain a lamp frequency control signal, and
   controlling the lamp frequency in accordance with said control signal.

* * * * *